Figure 1:
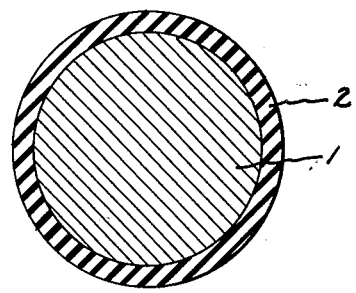

May 29, 1962  S. W. KANTOR ET AL  3,036,991
POLYESTERS FROM HYDROQUINONE, DIHYDROXYBIPHENYL
AND ISOPHTHALIC ACID REACTANTS
Filed June 1, 1960

Inventors:
Simon W. Kantor,
Fred F. Holub,
by James N. Underwood
Their Agent,

United States Patent Office 3,036,991
Patented May 29, 1962

3,036,991
POLYESTERS FROM HYDROQUINONE, DIHYDROXYBIPHENYL AND ISOPHTHALIC ACID REACTANTS
Simon W. Kantor, Schenectady, and Fred F. Holub, Scotia, N.Y., assignors to General Electric Company, a corporation of New York
Filed June 1, 1960, Ser. No. 33,126
10 Claims. (Cl. 260—47)

This invention relates to synthetic polymeric compositions, and more particularly, to a superpolyester formed of p-phenylene isophthalate units interspersed with p,p'-biphenylene isophthalate units, and still more particularly, to such superpolyesters having an intrinsic viscosity of at least 0.5 and wherein the p-phenylene isophthalate units are at least 40 mole percent of the total p-phenylene isophthalate and p,p'-biphenylene isophthalate units in such superpolyesters.

Although superpolyesters are well known in the art, superpolyesters have had to have an aliphatic component in the polymer chain in order for them to be obtained with the high molecular weight characteristic of the superpolyesters. The ordinary resinous esters of a dicarboxylic acid and a dihydric alcohol are polymers having many monomeric units in the polymer molecule, but they still have relatively low molecular weights as compared to the superpolyesters. Because of the longer polymer molecule associated with the higher molecular weights, the superpolyesters have many useful properties not possessed by the corresponding resinous esters, for example, the impact, flexible and tensile strength properties, are much greater and furthermore, the films and fibers which can be formed from the superpolyesters can be structurally oriented by cold drawing techniques to produce films and fibers which are much more flexible and of higher strength properties in the direction of orientation than the unoriented products.

It has long been known that aromatic ring compounds are much more stable and have much more desirable high temperature properties than the corresponding aliphatic compounds. Unfortunately, the aromatic compounds usually have correspondingly higher melting points. Therefore, there have been many attempts to prepare polyesters from dihydric phenols and aromatic dicarboxylic acids for use in applications requiring the ability to withstand degradation at elevated temperatures. However, in all attempts the product has been an infusible, insoluble polymer, or a very brittle polymer of no utility, depending on the particular phenol and acid chosen. The closest approach to obtaining a completely aromatic superpolyester has been to react a dihydric phenol with an alkylene oxide to produce a bis(hydroxyalkoxy)aryl compound. For example, in order to make a superpolyester using hydroquinone, the latter is first reacted with, for example, ethylene oxide, to produce 1,4-bis(β-hydroxyethoxy)benzene. These compounds are esterified by reaction with a dibasic acid or a dibasic acid chloride, or by an ester interchange reaction to form its corresponding superpolyester. The alkyl groups in the polymer chain lowered the melting point and increased the solubility sufficiently that either melt or solvent processes could be used for carrying out the reaction. Although such a procedure permitted dihydric phenols and aromatic dicarboxylic acids to be incorporated into superpolyesters, the high temperature stability of the product was sacrificed, due to the introduction of the aliphatic groups into the polymeric chain. Any attempt to react dihydric phenol with a dicarboxylic acid or the ester or acid chloride derivative thereof always resulted in the obtaining of low molecular weight materials which were insoluble and infusible or extremely brittle. The melt process failed because of the fact that even the melting point of the low molecular weight material was so high that thermal decomposition of the polymer always resulted prior to the obtaining of the required high molecular weight material. The ester interchange or the reaction of the acid chloride always failed because of the fact that if carried out in solution the low molecular weight material was precipitated from the solution and was incapable of reacting further to form the high molecular weight material. Attempts to heat the low molecular weight polymer or carry out the reaction without the use of solvents always failed, again because thermal decomposition took precedence over the formation of the high molecular weight polymer.

Figure 2:
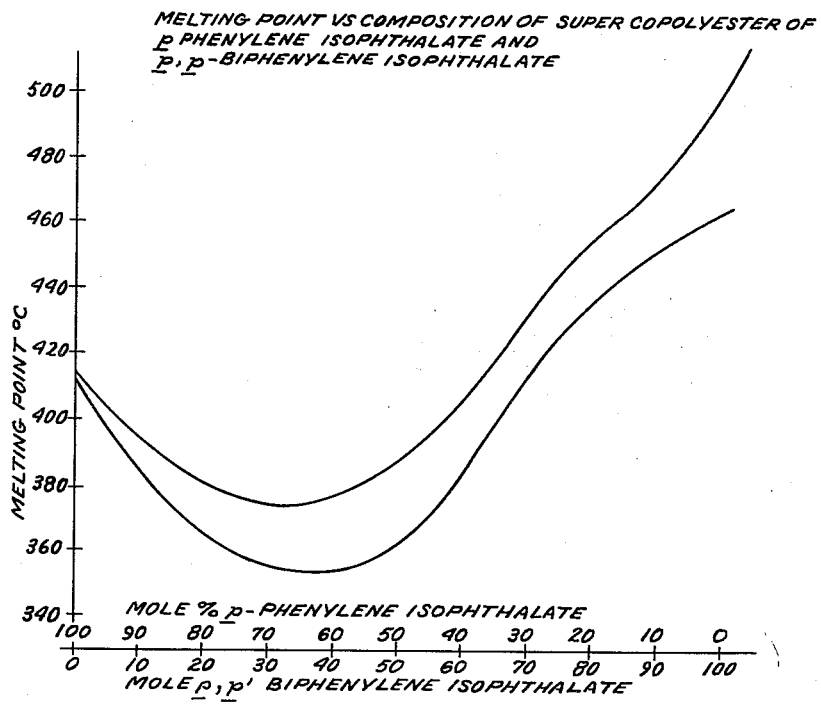

Our invention may be better understood by reference to the following description, taken in connection with the following drawings, in which:

FIG. 1 is a cross-sectional view of an insulated electrical conductor within the scope of the present invention; and FIG. 2 is a plot showing how the melting point of the various products within the scope of our invention varies with the different ratios of p-phenylene isophthalate and p,p'-biphenylene isophthalate units in the copolyester.

We have discovered that superpolyesters formed of p-phenylene isophthalate units interspersed with p,p'-biphenylene isophthalate units which can also be described as supercopolyesters of p-phenylene isophthalate and p,p'-biphenylene isophthalate, can be made which have intrinsic viscosities of at least 0.5. Surprisingly, the melting point, is, at most, only slightly higher than the corresponding, lower molecular weight polyesters, but the physical properties are increased tremendously. These superpolyesters contain the structural units (A) 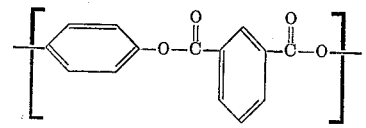

(B) 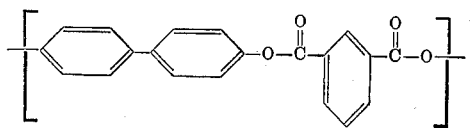

which are joined into long molecular chains in a wide variety of fashions; for example, they can be in a random pattern such as A—B—A—A—A—B—A—B—B—. A block pattern such as: —A—A—A—A—A—B—B—B—B—A—A—A—A—A—; or a regular pattern such as: —A—A—A—A—B—A—A—A—A—A—B—A—A—A—B—. The ordered pattern such as: —A—B—A—B—A—B—A—B— is possible but commercially impractical of attainment. The pattern of the units and the ratio of A to B units can be controlled by the order of reaction and amount of reactants. The polymer molecule containing both of these units can be represented by the fromula (C) 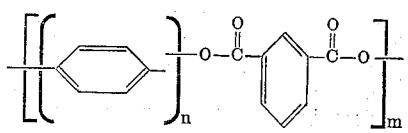

where $n$ is an integer from 1 to 2 and $m$ represents the number of repeating units in the molecular chain, the total number of such units in our superpolyesters is probably at least 50 or higher. However, intrinsic viscosity is a better means of indicating molecular weight due to the uncertainties of determining the actual number of units in the molecule which at best is an average value of approximate magnitude.

Intrinsic viscosity is well known in the art and is described in detail in many places in the published literature, for example on page 309 of the book by P. J. Flory, "Principles of Polymer Chemistry," Cornell University Press, Ithaca, New York, 1953. An intrinsic viscosity of at least 0.5, which in the case of our polymers is measured at 75° C. while dissolved in trichoroacetic acid or 2,4,6-trichlorophenol, is necessary in order for the polymers to be used for making of films and fibers having any utility. Polyesters having intrinsic viscosities below this value lack the necessary properties to form useful films and fibers as indicated by their brittleness which increases as the intrinsic viscosity decreases.

The preparation of the superpolyesters is made possible by our discovery that there is a particularly useful group of solvents having the unique property that, although they are not solvents for the polymer at ordinary temperatures, they do become solvents for the completely aromatic polyesters at elevated temperatures, and for the first time permit superpolyesters to be easily prepared from a dihydric phenol and an aromatic dicarboxylic acid when used in the form of the aromatic dicarbonyl halide. Surprisingly enough, not all solvents which are capable of dissolving the resinous polyesters resulting from the reaction are capable of producing the superpolyesters. This unique property appears to be limited to benzophenone, m-terphenyl, chlorinated biphenyls, brominated biphenyls, chlorinated diphenyl oxides, brominated diphenyl oxides, chlorinated naphthalenes, and brominated naphthalenes. The reaction of dihydric phenols with aromatic dicarbonyl halides while dissolved in this special class of solvents is more particularly described and claimed in our copending application Serial No. 33,124 filed concurrently herewith and assigned to the same assignee as the present invention.

The above method is particularly applicable for the production of fusible, thermoplastic, linear superpolyesters formed of p-phenylene isophthalate units interspersed with p,p'-biphenylene isophthalate units, wherein the p-phenylene isophthalate units are at least 40 mole percent of the total p-phenylene isophthalate and p,p'-biphenylene isophthalate units in said superpolyester and the intrinsic viscosity of the product is at least 0.5. These superpolyesters are prepared by the reaction of hydroquinone and 4,4'-dihydroxybiphenyl with an isophthaloyl halide in a 1-step process, or by the reaction of hydroquinone first with an isophthaloyl halide and further reacted with 4,4'-dihydroxybiphenyl while dissolved in one of the above-named solvents. Preferably, the isophthaloyl halide is isophthaloyl chloride. The solution is heated to a temperature in the range of 270° C. up to the reflux temperature of the solution until the evolution of the hydrogen halide is at least substantially complete. In the 2-stage process of producing our compositions, the 4,4'-dihydroxybiphenyl is added after substantially all of the hydroquinone has reacted with the terephthaloyl halide. The heating step to evolve the additional hydrogen halide is continued.

Alternatively, we have found that these superpolyesters may be prepared by another but less suitable method involving the use of the same specific group of solvents. This method involves the ester interchange reaction between a di-(monobasic acid)ester of both the hydroquinone and 4,4'-dihydroxybiphenyl, and isophthalic acid. In this reaction, the isophthalic acid and the diesters of hydroquinone and the 4,4'-dihydroxybiphenyl, e.g., the diacetate, dipropionate, dibenzoate, and so forth, esters of hydroquinone and 4,4'-dihydroxybiphenyl are dissolved in the solvent, if a 1-stage process is being used, and heated to a temperature in the range of 240° to 350° C. under reflux conditions which allow distillation of the monohydric acid moiety of the diester, for example, acetic acid, if the esters are p-phenylene diacetate (hydroquinone diacetate) and p,p'-biphenylene diacetate. In the 2-stage process, one diester may be added first, and reacted, followed by the addition of the second diester. Preferably, the hydroquinone diester is reacted first and the diester of 4,4'-dihydroxybiphenyl is reacted in the second stage, if a 2-stage process is used. In contrast to the 30–120 minutes required for the reaction of the acid halide with the dihydric phenols, the above ester interchange reaction requires an extremely long time, for example, from 6 to 10 hours. The ester interchange reaction is incapable of removing all of the monobasic acid ester groups and those still remaining in the polymer reduce the high temperature stability of the polymer. The monobasic acid ester groups which are not removed are also a measure of a lower molecular weight, since they occupy terminal groups which are potential chain propagating sites. This method is, however, capable of producing superpolyesters formed of p-phenylene isophthalate units interspersed with p,p'-biphenylene isophthalate units having an intrinsic viscosity in the range of 0.5 to 0.7. For best products, we prefer to use the reaction of hydroquinone and 4,4'-dihydroxybiphenyl with isophthaloyl chloride. Such a reaction is capable of producing transparent, water white, tough, strong products having intrinsic viscosities in the range of 0.5 to 2.0 and above. Either the 1-stage or 2-stage processes may be used. However, for those compositions containing the maximum or near maximum amount of p,p'-biphenylene units, e.g., 40–60 mole percent, we prefer to use the 2-stage process in order to minimize the formation of large blocks of p,p'-biphenylene isophthalate units which contain no p-phenylene isophthalate units within the polymer molecule. Since the effect of such large blocks is to increase the melting point considerably and decrease the solubility in comparison to a superpolyester of the same composition without such blocks.

FIG. 2 illustrates graphically the relationship between the melting point and the composition of the superpolyesters made by the 2-stage process. In carrying out the 2-stage process, all of the hydroquinone is reacted first with the isophthaloyl halide, while dissolved in the solvent, at the reaction temperature, until at least substantially all of the hydrogen halide is evolved, and then the 4,4'-dihydroxybiphenyl is added and the reaction continued to completion. Such a process minimizes the formation of large units of p,p'-biphenylene isophthalate units in the polymer molecule.

In our copending application Serial No. 33,131, filed concurrently herewith and assigned to the same assignee as the present invention, we have disclosed and claimed superpolyesters of p-phenylene isophthalate and mono- and di-chloro-substituted isophthalates and supercopolyesters of these materials. Although p,p'-biphenylene isophthalate has a relatively high melting point, we have discovered that if a superpolyester is made having both p-phenylene isophthalate and p,p'-biphenylene isophthalate units in the polymer molecule, i.e., a supercopolyester of these two materials, that the product has a lower melting point range than the p-phenylene isophthalate which is the lower melting of the two separate materials. This lowering of the melting point range is illustrated graphically in FIGURE 2. In determing the points from which these curves were drawn, a standard melting point apparatus using a heated metal block was used. The lower curve represents where the edges of the mass of powdered resin became clear and the top curve represents where the entire mass of resin became clear without application of pressure. The area between the two curves represents the temperatures which can be used to shape our compositions under heat and pressure, e.g., by molding, extrusion, etc., into useful articles. Normally, we prefer to use temperatures at, near, or slightly higher than the top curves. In general, the melting point curves for the 1-stage process are generally higher than the same compositions made by the 2-stage process. Therefore, we prefer to use the 2-stage process when the object is to obtain the lower melting compositions. It will be noticed that the surprising effect of lowering the melting point range by the addition of a higher melting component extends from practically 0 mole percent, e.g., 0.1 mole percent up to 60 mole percent of p,p'-biphenylene isophthalate units. Our preferred range is from 10 to 50 mole percent p,p'-biphenylene isophthalate units in the superpolyester.

Other related superpolyesters are disclosed and claimed in our copending applications, filed concurrently herewith and assigned to the same assignee as the present invention:

(1) Linear superpolyesters formed of p-phenylene isophthalate units interspersed with p-phenylene terephthalate units, the intrinsic viscosity of the polyester being at least 0.5 and the isophthalate content being at least 60 mole percent of the total isophthalate and terephthalate content of the superpolyester, disclosed and claimed in our copending application Serial No. 33,125.

(2) Chlorine-containing p-phenylene isophthalate, linear superpolyesters having an intrinsic viscosity of at least 0.5 wherein at least 15 mole percent of the isophthalate radicals have from one to two chlorine substituents on the aryl nucleus and the p-phenylene radicals are selected from the group consisting of p-phenylene, monochloro-p-phenylene and dichloro-p-phenylene groups, disclosed and claimed in our copending application Serial No. 33,127.

(3) Linear, superpolyesters formed of the four structural units (1) p-phenylene units (2) units selected from the group consisting of o-phenylene units, m-phenylene units and o,o'-biphenylene units, (3) isophthalate units and (4) terephthalate units, the sum of (1), (2), (3) and (4) equalling 100% of the total units of the polymer, the units of (1) being from 25 to 45% of the total units, the units of (2) being from 5 to 25% of the total units, the units of (3) being from 20 to 45% of the total units, the units of (4) being from 5 to 30% of the total units, the units of (1) and (2) forming esters with the units of (3) and (4), the sum of (1) and (2) being from 1 to 1.05 times the sum of (3) and (4) and the sum of (1) and (4) being no greater than 0.7 times the total sum of units, disclosed and claimed in our copending application Serial No. 33,128.

(4) Linear superpolyesters formed of m-phenylene terephthalate units interspersed with from 0 to 30 mole percent of p-phenylene terephthalate units, based on the total m-phenylene terephthalate and p-phenylene terephthalate units, the intrinsic viscosity of said superpolyester being at least 0.5, disclosed and claimed in our copending application Serial No. 33,130.

In order that those skilled in the art may better understand our invention, the following examples are given by way of illustration and not by way of limitation.

EXAMPLE 1

This example illustrates the preparation of a poly-p-phenylene, p,p'-biphenylene isophthalate copolymer by the one-stage method.

A mixture of 4.40 grams of hydroquinone (0.04 mole), 1.85 grams of sublimed 4,4'-dihydroxybiphenyl (0.01 mole), 10.15 grams of isophthaloyl chloride (0.05 mole), and 100.0 grams of redistilled mixed pentachlorobiphenyls was stirred and heated under nitrogen. After 4 minutes the temperature of the homogeneous yellow solution was 200° C., and the HCl evolution was vigorous. After 11 minutes, the temperature had reached 340° C.; the reaction was allowed to proceed for an additional 9 minutes at 360° C. resulting in the formation of a yellow viscous solution. This solution was allowed to cool whereby the polymer precipitated at a temperature of approximately 260° C. When the mixture had cooled to room temperature, the polymer was separated from the reaction mixture by adding acetone and filtering. The solid was washed twice with 500 ml. portions of hot acetone, filtered and dried to yield 12.3 grams of poly-p-phenylene-p,p'-biphenylene isophthalate. A sample of this polymer had an intrinsic viscosity of 0.53 in a 50–50 mixture of orthochlorophenol and 2,4,6-trichlorophenol at 117° C. This polymer had a melting point of 360°–370° C. and was molded between aluminum foil at a temperature of 405° C. under a pressure of 2000 lbs./square inch. After quenching in water the resulting film was transparent, flexible, and tough. This film is amorphous and has a density of 1.3205 grams/cc. at 25° C. By heating the film at 300° C. for several hours, the polymer crystallizes to give a transparent, crystalline, tough film with a density of 1.3780 grams/cc.

Amorphous, transparent films or tapes of poly-p-phenylene-p,p'-biphenylene isophthalate may also be prepared by direct extrusion through a die followed by immediate quenching of the hot films. The hot film may also be stetched 100–200% at 200°–250° C. to yield an oriented polymer which can in turn be crystallized or heat-set by heating above 300° C. for desired lengths of time. The crystallized film is still transparent and tougher and stiffer than the amorphous film.

Fibers of this copolymer can be prepared by drawing fibers from the melt under nitrogen or by extruding the melt through a die to form monofilaments. The fiber may be quenched to form an amorphous fiber which subsequently can be oriented and crystallized at 300° C. Alternatively, the hot fiber may be stretched and crystallized as it is extruded through the die. In this manner, crystallized, tough films with densities greater than 1.38 grams/cc. are readily prepared.

A conductor insulated with this copolymer can be prepared by direct extrusion of the polymer through a die onto a nickel-coated copper wire at 400° C., followed by quenching in water. The amorphous polymer on the wire is crystallized by heating at 300° C. for 2 hours to form an extremely tough, adherent, electrical insulation on the wire. A second method which is useful for preparing an insulated conductor involves wrapping either an aluminum or copper wire with an amorphous, continuous 1-inch wide tape of the poly-p-phenylene-p-biphenylene isophthalate. The tape is wrapped so as to overlap the edges by about ⅛ inch. The resulting wrapped conductor when heated at 325° C. for ½ hour, crystallizes the polymer and causes it to shrink tightly around the wire.

EXAMPLE 2

This example illustrates the preparation of a poly-p-phenylene-p,p'-biphenylene isophthalate copolymer made by the 2-stage method. This polymer was made using excess hydroquinone as a chain-stopper.

A mixture of 7.88 grams (0.0715 mole) of hydroquinone, 20.30 grams (0.100 mole) of isophthaloyl chloride and 238.5 grams of mixed trichlorobiphenyls was heated and stirred. After 1.5 minutes, the temperature of the reaction was 140° C. and the HCl evolution had started. After 10 minutes the temperature had reached 298° C. at which time most of the HCl evolution had subsided. The mixture was stirred and heated for another 3.5 minutes at a temperature of 298°–300° C. The reaction mixture was cooled to 140° C., which caused the polymer to precipitate. There was added 5.59 grams (0.030 mole) of 4,4'-dihydroxybiphenyl and the stirring and haeting were resumed. After 14 minutes the temperature had risen to 323° C. and the polymer was completely in solution. The reaction mixture was heated and stirred for another 25 minutes at a temperature of 317°–325° C. The resulting solution was quite viscous and was allowed to cool whereby the polymer precipitated at a temperature of 243° C. When cooled to room temperature the polymer was separated from the reaction mixture and washed 4 times with 1-liter portions of hot acetone, filtered and dried by suction for 1½ hours, followed by overnight drying in air. There was obtained 25.7 grams (97%) of polymer which had a melting point of 355°–372° C. A sample of this polymer had an intrinsic viscosity of 0.70 in 2,4,6-trichlorophenol at 75° C. A onegram sample of the polymer was pressed between aluminum foil at a temperature of 380° C. and under a pressure of 2000 lbs./square inch. The resulting quenched film was transparent, colorless and flexible.

The following Table I shows proporeties of poly-p-phenylene-p,p'-biphenylene isophthalate copolymers prepared similarly to the method above varying only the ratio of hydroquinone and 4,4'-dihydroxybiphenyl.

Table I

POLY-p-PHENYLENE-p,p'-BIPHENYLENE ISOPHTHALATES

| Mole ratio R(OH)$_2$ | | $[\eta]^a$ | Yield, Percent | M.P., ° C. | Precipitation Temp., ° C. |
|---|---|---|---|---|---|
| H | DP | | | | |
| 90 | 10 | 0.78 | 97.1 | 388–394 | 295 |
| 80 | 20 | 0.73 | 96.2 | 362–379 | 290 |
| 70 | 30 | 0.70 | 97.0 | 355–372 | 243 |
| 60 | 40 | 0.79 | 98.9 | 355–374 | 240 |
| 50 | 50 | 0.75 | 96.8 | 360–387 | 255 |
| 40 | 60 | 0.73 | 96.7 | 386–405 | 280 |
| 30 | 70 | 0.71 | 96.7 | 412–438 | 300 |

Two stages:
H=hydroquinone (+1.5 mole percent excess)
DP=4,4'-dihydroxybiphenyl
$^a$ Determined in 2,4,6-trichlorophenol at 75° C.

The polymers listed in Table I were formed into fibers, tapes and films as described in Example 1. In all cases, these products were tough and flexible whether the polymers were amorphous or crystalline. Although all of the copolymers crystallized when heated above 300° C., the particular ones with the lower melting points crystallized at the slowest rate.

EXAMPLE 3

This example illustrates that our polymers may be prepared by an ester exchange reaction, provided that our solvents are used.

A mixture of 15.88 grams of p-phenylene di-acetate (0.082 mole), 5.41 grams of 4,4'-diacetoxybiphenyl (0.0200 mole), 16.61 grams of isophthalic acid (0.100 mole) and 233.0 grams of mixed trichlorobiphenyls was placed in a reaction flask fitted with a stirrer, a Dean-Stark trap attached to a condenser, and a thermometer. This mixture was stirred while gradually increasing the temperature. After heating for 20 minutes the temperature of the reaction was 291° C. and acetic acid was detected in the receiver flask. During the next 15 minutes of heating, the temperature was gradually increased to 317° C. while 10.5 grams of acetic acid was collected. The reaction was finally heated for an additional 270 minutes at 317°–323° C., during which time there was obtained 2.5 grams of acetic acid making a total of 13.0 grams. The amber reaction mixture was allowed to cool whereby the polymer precipitated at 234° C. Titration of the total distillate with 1.0 N NaOH indicated that 95.3% of the theoretical amount of acetic acid was actually obtained. The polymer was washed 4 times with 1-liter portions of hot acetone, filtered, and dried to give 23.50 grams (96.5% yield) of tan poly-p-phenylene-p,p'-biphenylene isophthalate. A sample of this polymer had an intrinsic viscosity of 0.65 measured in 2,4,6-trichlorophenol at 75° C. This polymer formed tough, flexible, yellow films when pressed at 415° C. under 2000 lbs./square inch pressure.

If it is desired to modify the molecular weight of our linear polyesters, chain stopping agents such as one or more monohydric phenols or one or more monobasic acid chloride may be added in minor amounts, e.g., 0.1 to 1% of the corresponding difunctional compound may be added along with the other ingredients, during the condensation reaction, or after the main condensation reaction is completed. Examples of monohydric phenols which may be added are phenol itself, the cresols, e.g., ortho-, meta- and paracresol, the xylenols, e.g., 2,3-xylenol, 2,4-xylenol, 2,5-xylenol, 2,6-xylenol, 3,5-xylenol, etc., the hydrocarbons and hydrocarbonoxy-substituted phenols, e.g., ethylphenol, propylphenol, isopropylphenol, butylphenol, tertiary butylphenol, amylphenol, the phenylphenols, naphthylphenols, the phenoxyphenols, the methoxyphenols, ethoxyphenols, phenoxyphenols, etc., including all of those phenols in which one or more of the hydrogen atoms attached to the aryl nucleus are replaced by a halogen atom such as fluorine, chlorine, bromine, or iodine, e.g., the mono-, di-, tri-, tetra- and pentachlorophenols, the mono-, di-, tri-, tetra- and pentabromophenols, the mono-, di-, tri-, tetra- and pentaiodophenols, the mono-, di-, tri-, tetra- and pentafluorophenols, the mono-, di-, tri-, tetrachlorocresols, and the mono-, di-, tri-, chloroxylenols, etc. The monohydric phenol may also be a di- or trihydric phenol in which all but one hydroxyl group has been esterified with an acid, e.g., p-hydroxyphenylbenzoate, p-hydroxyphenyltoluate, m-hydroxyphenylbenzoate, o-hydroxyphenylbenzoate, 5-hydroxyphenylene-1,3 dibenzoate, etc.

In those cases where free hydroxyl groups are desired in the polymer chain, a dihydric phenol, e.g., hydroquinone, resorcinol, etc., may be used as the chain stopping agent, as illustrated in Example 2.

Monobasic acid halides which may be used are the acid halides of the aromatic series such as benzoyl chloride, benzoyl bromide, benzoyl iodide, toluoyl chloride, naphthoyl chloride, biphenylcarbonyl chloride, etc., including halogenated derivatives thereof. Although monobasic acid halides of the aliphatic series may be used, we prefer not to use them since they destroy the high temperature stability of the polymers. For the same reason, we prefer that the esters of the di- and trihydric phenols be aromatic monocarboxylic acid esters and that, if substituted, the substituent grouping be chlorine.

The superpolyesters of this invention are suitable for a wide variety of uses. As coating compositions they may be coated onto metallic or non-metallic substrates by flame spraying, melt casting, or by casting while dissolved in one of the solvents in which it is made, and thereafter evaporating the solvent at an elevated temperature and at reduced pressure. The hot solution of the solvent may be forced through a spinneret into a heated drying tower, preferably maintained at reduced pressure to form filaments and fibers, or the molten polymer may be forced through spinnerets by well known techniques to form filaments and fibers. In both cases, the formed filament may be cold drawn to structurally orient the polymer in the direction of the fiber axis to increase the tensile strength. The fibers so formed may be formed into yarns or used to form fiber matting. Alternatively, the superpolyesters may be cast from solution or from the melt of the polymer, extruded through a die, or otherwise sheeted to form a continuous film of the superpolyester. These films may be oriented by cold drawing in either one or both of their major dimensions, to orient the polymer molecules in the plane of the film. For best properties, it is well to form a balanced film by orienting in both directions. It is to be understood that the cold drawing of either the film or fiber involves any stretching and/or rolling of the film below the melting point of the polymer. Preferably, the cold-drawing is done above the second order transition temperature of the polymer. The amount of stretching and/or rolling is usually sufficient to increase the dimensions to at least twice the original length in the case of fibers, and to twice the surface area of the plane in the case of a film. The oriented film is heat-set between 200°–350° C. but preferably 275°–350° C. while maintained under tension. As the examples have illustrated, the crystalline products formed by heat and pressure and allowed to cool slowly are translucent or opaque. If, instead of allowing an object to cool slowly, it is cooled rapidly, for example by quenching in cold water or in a blast of cold air, the material is transparent and amorphous. If this amorphous material is heated above its second-order transition point, but below its softening point, e.g., to a temperature in the range of 200°–350° C., but preferably 275°–350° C., the amorphous state is unstable and the film crystallizes. However, in contrast to the crystalline state obtained by slow cooling of the film from the molding temperature, the film remains clear and flexible. The effect of this crystallization is to cause the density of the polymer to increase and for the actual physical dimensions to decrease. This same effect would be noticed if the polymer was extruded in the form of tubing and quenched. This shrinkage can be utilized to advantage, for example, in the preparation of an insulated electrical conductor shown in FIG. 1. In the case of the film, electrical conductor 1 is wound with the film in the form of a tape in a spiral fashion with either the adjacent edges abutting each other or overlapping to produce insulating layer 2. In the case of tubing, the tubing is slipped onto electrical conductor 1 to provide insulation layer 2. In both cases, the film or tubing is shrunk tightly onto electrical conductor 1 by heating insulation layer 2 to a temperature in the range of 200° –350° C. but preferably 275°–350° C.

Other uses for our films and the fabrics or mats made from the fibers include a wide variety of electrical applications, that is, as a dielectric, for example, as a dielectric in capacitors, as slot insulation for motors, primary insulation for heat-resistant wire, pressure-sensitive electrical tape, split mica insulating tape, i.e., mica sheet laminated between film, small condensers, metal foil laminated to film or film having an adherent metal coating, weather resistant electrical wire, i.e., a conductor wrapped with film coated with asphalt, as a wrapping for submerged pipe to insulate against ground currents, as primary and secondary insulation in transformer construction, as a dielectric in electroluminescent structures, etc. They may also be used to laminate or adhere glass and metal surfaces to themselves, to each other, or to a like surface. Two mating glass objects may be heat-sealed vacuum-tight by inserting an interlayer of the superpolyester either as a powder, as a film or as a surface coating between two glass surfaces to be joined. Pressure or vacuum is applied to the assembly after it is heated to the softening point of the superpolyester to firmly adhere the two glass surfaces together. This process may be used for forming vacuum-tight seals between two mating glass surfaces, such as for making a cathode ray tube or other devices as disclosed and claimed in the application Serial No. 33,129 of Day et al., filed concurrently herewith and assigned to the same assignee as the present invention.

Other valuable uses for the superpolyesters of p-phenylene-p,p'-biphenylene isophthalate will be readily apparent to those skilled in the art. Also, many apparently widely different embodiments such as the adding of pigments, fillers, stabilizers, plasticizers, etc. may be made to modify the properties of the polymers without departing from the spirit and scope of the invention. It is therefore to be understood that changes may be made in the particular embodiments of the invention described which are within the full intended scope of the invention as defined by the appended claims.

What we claim as new and desire to secure by Letters Patent of the United States is:

1. A linear superpolyester of p-phenylene isophthalate units interspersed with p,p'-biphenylene isophthalate units, the intrinsic viscosity of said superpolyester being at least 0.5 and the p-phenylene isophthalate units being at least 40 mole percent of the total p-phenylene isophthalate and p,p'-biphenylene isophthalate units in said superpolyester.

2. The linear superpolyester of claim 1 wherein the p-phenylene isophthalate units are in the range of 50– 90 mole percent of the total p-phenylene isophthalate and p,p'-biphenylene isophthalate units in said superpolyester.

3. A fiber comprising a crystalline, linear superpolyester of p-phenylene isophthalate units interspersed with p,p'-biphenylene isophthalate units, the intrinsic viscosity of said superpolyester being at least 0.5 and the p-phenylene isophthalate units being at least 40 mole percent of the total p-phenylene isophthalate and p,p'-biphenylene isophthalate units in said superpolyester, said fiber having been cold drawn to structurally orient the polymer in the direction of the fiber axis.

4. A film comprising an amorphous, linear superpolyester of p-phenylene isophthalate units interspersed with p,p'-biphenylene isophthalate units, the intrinsic viscosity of said superpolyester being at least 0.5 and the p-phenylene isophthalate units being at least 40 mole percent of the total p-phenylene isophthalate and p,p'-biphenylene isophthalate units in said superpolyester.

5. A film comprising a crystalline, linear superpolyester of p-phenylene isophthalate units interspersed with p,p'-biphenylene isophthalate units, the intrinsic viscosity of said superpolyester being at least 0.5 and the p-phenylene isophthalate units being at least 40 mole percent of the total p-phenylene isophthalate and p,p'-biphenylene isophthalate units in said superpolyester.

6. The film of claim 5 which has been cold drawn in at least one of its two major dimensions to structurally orient the polymer in at least one direction in the plane of the film.

7. A film comprising an essentially transparent, crystalline, linear superpolyester of p-phenylene isophthalate units interspersed with p,p'-biphenylene isophthalate units, the intrinsic viscosity of said superpolyester being at least 0.5 and the p-phenylene isophthalate units being at least 40 mole percent of the total p-phenylene isophthalate and p,p'-biphenylene isophthalate units in said superpolyester.

8. The process of preparing an essentially transparent, crystalline, linear superpolyester of p-phenylene isophthalate units interspersed with p,p'-biphenylene isophthalate units, the intrinsic viscosity of said superpolyester being at least 0.5 and the p-phenylene isophthalate units being at least 40 mole percent of the total p-phenylene isophthalate and p,p'-biphenylene isophthalate units in the polymer, which comprises heating a quenched, amorphous form of said superpolyester to a temperature of 200°–350° C. until equilibrium of the crystalline state is essentially established.

9. An insulated, electrical conductor comprising an electrical conductor having on its surface a linear superpolyester of p-phenylene isophthalate units interspersed with p,p'-biphenylene isophthalate units, the intrinsic viscosity of said superpolyester being at least 0.5 and the p-phenylene isophthalate units being at least 40 mole percent of the total p-phenylene isophthalate and p,p'-biphenylene isophthalate units in said superpolyester.

10. The process of making an insulated, electrical conductor which comprises covering an electrical conductor with an amorphous, linear superpolyester of p-phenylene isophthalate units interspersed with p,p'-biphenylene isophthalate units, the intrinsic viscosity of said superpolyester being at least 0.5 and the p-phenylene isophthalate units being at least 40 mole percent of the total p-phenylene isophthalate and p,p'-biphenylene isophthalate units in said superpolyester and thereafter causing said superpolyester to shrink onto the electrical conductor by heating said superpolyester to a temperature in the range of 200°–350° C.

References Cited in the file of this patent

UNITED STATES PATENTS

| | | |
|---|---|---|
| 2,595,343 | Drewitt et al. | May 6, 1952 |
| 2,954,355 | Young et al. | Sept. 27, 1960 |